Sept. 10, 1929.        H. RENNER        1,727,939
ART OF FORESTING AND DYEING STANDING LIVING TREES
Filed March 7, 1924
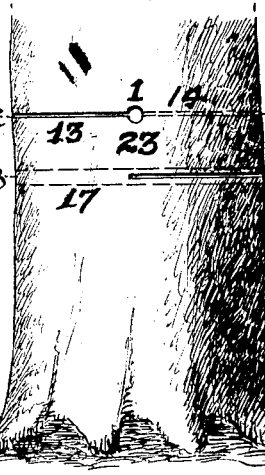
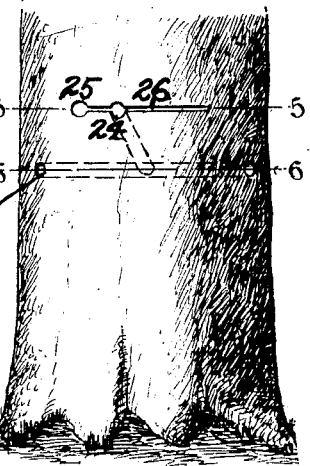
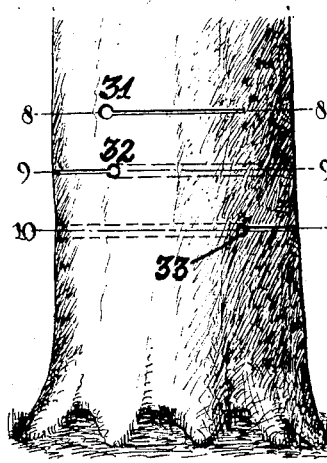
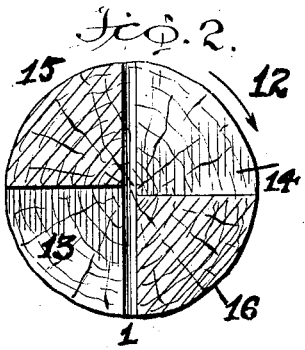
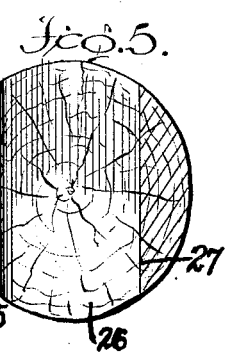
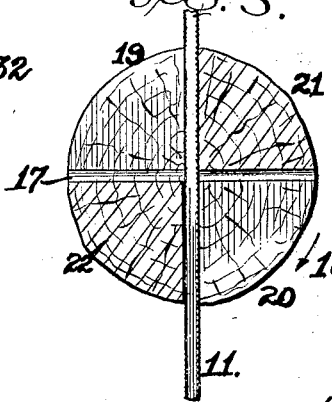
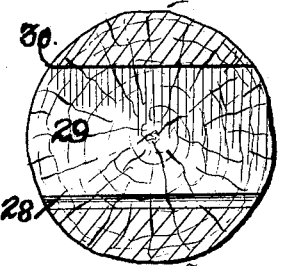
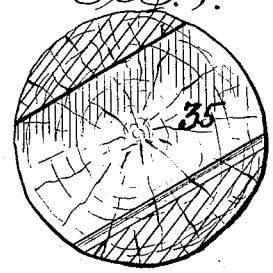
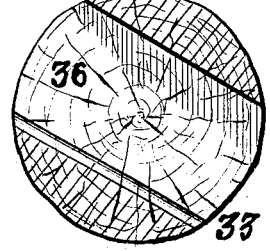
Inventor
Herbert Renner,
By Fenelon B. Brock
Attorney Patented Sept. 10, 1929.

1,727,939

UNITED STATES PATENT OFFICE.

HERBERT RENNER, OF PHILADELPHIA, PENNSYLVANIA, ASSIGNOR, BY MESNE ASSIGNMENTS, TO CHEMICOLOR WOOD PRESERVING CO., A CORPORATION OF DELAWARE.

ART OF FORESTING AND DYEING STANDING LIVING TREES.

Application filed March 7, 1924. Serial No. 697,652.

My invention relates to cutting standing timber and dyeing the same before it is felled—that is, before its cellular structure is distorted by drying and seasoning. Wood is capable of taking certain dyes when they are applied in a definite way provided the wood contains substantially its full complement of moisture.

To enable the lumberman to practice my invention reference will be made to the drawings accompanying this application in which:

Figure 1 is a side elevation of stumpage illustrating one form of the invention.

Figure 2 is a horizontal section on line 2—2 of Fig. 1.

Figure 3 is a horizontal section on line 3—3 of Fig. 1, and showing in addition a saw blade inserted therethrough having teeth upon both edges.

Figure 4 is a side elevation of another tree or stumpage showing a modified form of carrying out my improvements.

Figure 5 is a horizontal section of Fig. 4 on line 5—5.

Figure 6 is another horizontal section taken on the line 6—6 of Figure 4.

Figure 7 is still another form of my invention, and shows a side elevation of a stumpage or base similar to Figs. 1 and 4.

Figure 8 is a horizontal section taken on line 8—8 of Fig. 7.

Figure 9 is a second cross section of Fig. 7 taken on line 9—9 thereof; and

Figure 10 is a third cross section taken on line 10—10 of Fig. 7.

Certain borings and cuttings or sawings hereinafter referred to are made in the living standing tree by making suitable incisions transversely of its base, and feeding the dye thereto as it becomes absorbed by the cellular tissue and carried therein through the water content; after the manner set forth in my prior Patents No. 1,570,575, dated January 19, 1926; and No. 1,683,488, dated September 4, 1928.

Referring specifically to the drawings which represent a number of preferred ways in which my invention may be carrier out, the numeral 1 (Fig. 1) represents a substantially horizontal hole bored through the base of a standing living tree.

It should be parenthetically stated that all of the following operations should be carried out as near the roots of the tree as possible in order to save stumpage.

Preferably a double edged saw blade, such as 11, (see Fig. 3) is inserted in the hole 1 (Figs. 1 and 2) at the section 2—2 and reciprocated and oscillated, by a sort of compound movement, the oscillating motion pivoting substantially about the transverse center of the tree, say in the direction of the arrow 12, Figure 2, until something like two opposite quadrant-shaped saw kerfs 13 and 14 are cut, as clearly shown in Figures 1 and 2, section line 2—2.

15, 16, represent the remaining oppositely disposed uncut quadrants interposed between the saw kerfs 12 and 13 on the same horizontal section 2—2.

Another hole 17 is then bored, transversely to the hole 1, horizontally through the central part of the tree on the line 3—3, but in a plane above or below the plane 2—2, (the drawing shows it below). The saw blade 11 is inserted in hole 17 (see Fig. 3) and manipulated similarly to the sawing operation described in connection with plane section 2—2, as shown by the arrow 18 on Figure 3, where the opposite quadrant saw kerfs 19 and 20 are shown alternating with the uncut quadrants 21 and 22 on the same plane 3—3 (shown also in Figure 1). The saw 11 was first inserted in hole 17, and is shown in Figure 3 at the end of its cutting operation after having been reciprocated and oscillated substantially through an arc of 90 degrees in cutting the quadrant kerfs 19 and 20.

At this stage of the operation it will be noted that all the sap ducts of the living tree have been intercepted and broken across the entire diameter of the tree and that no sap can now flow up through the tree roots to the bole of the tree or its branches or leaves.

At this stage the tree still stands in spite of the fact that the quadrant kerfs have been cut at two different horizontal planes 2—2 and 3—3 leaving between them about the center of the tree an uncut vertical woody tree structure in the region marked 23 of Figure 1, which temporarily holds the tree upright while being dyed.

The outer edges of the saw kerfs are then tamped or closed by impervious strips or plastic, and the holes 1 and 17 are stoppered. Then a liquid dye is introduced into the saw kerfs and holes by means of hollow tubing leading to a tank of liquid dye and communicating therewith.

A separate dye tube may be employed at each section 2—2 and 3—3 or a hole may be bored through the tree to communicate with both sections, (such for example as the inclined boring or passage 24 shown in full and dotted lines in Fig. 4). In the latter case only one tube connection with the dye tank is needed.

The tree is then left to the action of the natural phenomena of tree growth. The circulatory sap system, deprived of its sap supply carries the liquid dye into its cellular structure under the influence of light, air and temperature, clear to and through the leaves,— the lungs of the tree.

The tree is then left for a brief time, depending upon weather conditions, when the entire tree,—bole, branches and leaves—will be dyed throughout, through and through.

After which the rather attenuated hitherto untouched wood in the region of the tree at 23 is severed and the tree felled and logged in the same manner as forests are at present lumbered. If desired the tree may be allowed to season standing, in which case of course, the saw kerfs and holes are untamped and the dye tank connection removed.

Figures 4, 5 and 6, represent a modified plan based upon the same principle as the previous figures.

25 is a hole horizontally bored at one side of the center of the tree through which the ordinary saw blade with teeth on edge may be inserted and a kerf 26 cut toward and past the tree center to a point, say 27, all on the line 5—5 in Figure 4. At the section line 6—6 (Fig. 4) another horizontal hole 28 at right angles to hole 25 (Figs. 4 and 6) is bored and at one side of the tree. The saw cuts from this hole, a horizontal kerf 29, toward and past the center of the tree to a point or edge 30, the level of the kerf 29 being below that of 26.

This operation has the effect of severing practically all of the sap ducts, except four small segments substantially equidistant about the circumference of the tree. The kerfs 26, 29 are connected by a boring or passage 24.

Thereafter the process of dyeing and felling the tree proceeds along the lines described in connection with Figs. 1, 2 and 3.

The method illustrated by Figures 7, 8, 9 and 10, is a further modification.

Here a hole 31 is bored on the section line 8—8; the hole 32 on the line 9—9; and the hole 33 on the line 10—10. Kerfs 34, 35 and 36, are cut from the holes respectively at different levels or planes. These kerfs 34, 35 and 36, are made across the tree in differing directions, and to an equal radial extent relative to the center of the tree; so that, like the other examples, such combined kerfs practically sever all the sap ducts of the bole. Borings similar to 24, Figure 4, connect all the kerfs 34, 35 and 36. The dyeing and marketing conditions are the same as previously described.

Other specific illustrations of the principles of the invention might be given, but these will suffice.

The term "horizontal" here used comprises such colorable variations from a true horizontal as come within the spirit of this invention.

I claim:—

The method of dyeing a standing tree which comprises boring holes thereacross at different levels and sawing horizontal kerfs from said holes in opposed directions so that the combined area of the kerfs covers substantially all the sap ducts of the tree, boring an inclined passage through the tree to affect the combined area of the kerfs covers sub- different levels, and introducing dye into the kerfs to be carried up through the sap ducts by the natural circulation of the tree.

HERBERT RENNER.